May 26, 1970     R. P. MONAGHAN ET AL     3,514,358
METHOD OF FORMING FISHING LURES AND THE LIKE
Filed June 3, 1968     5 Sheets-Sheet 1
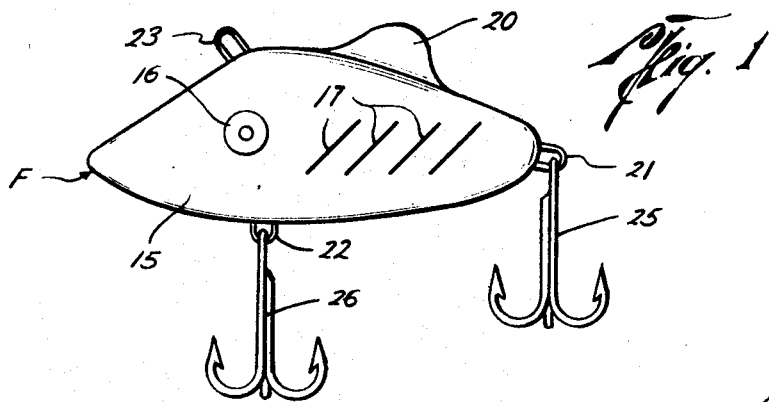
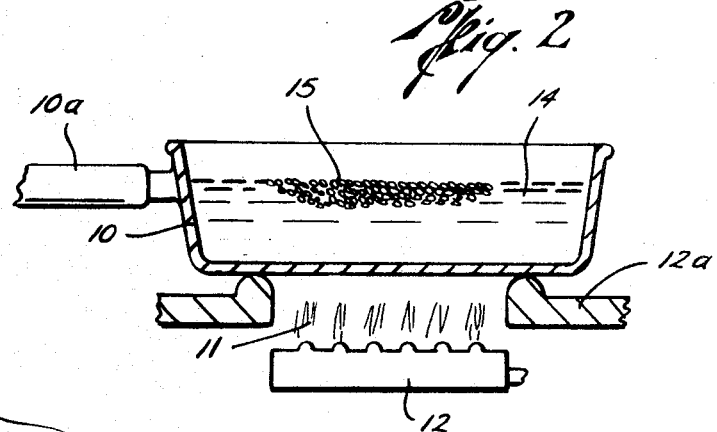
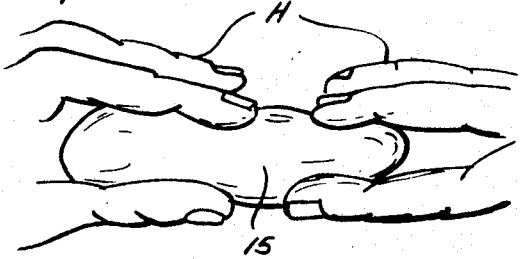
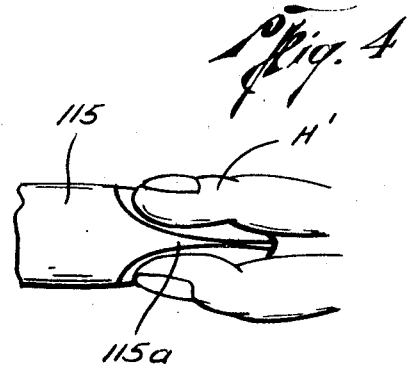
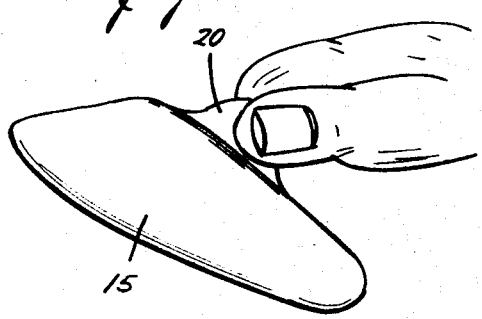
Richard P. Monaghan
Maurice P. Barton
        INVENTORS
BY
Hayden Pravel Wilson & Matthews
        ATTORNEYS

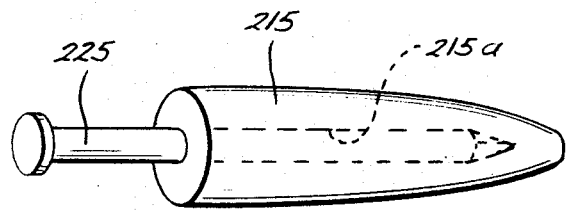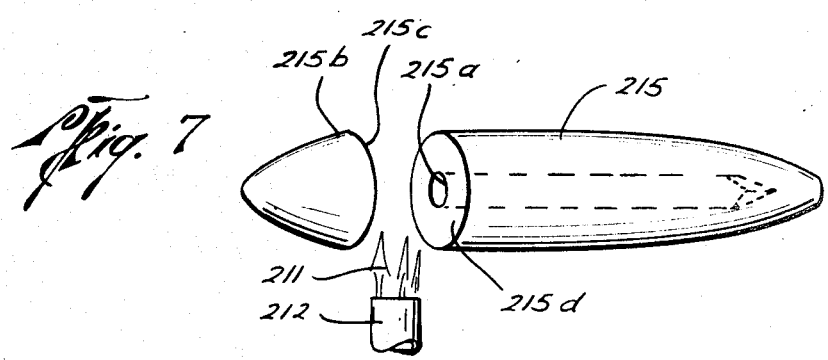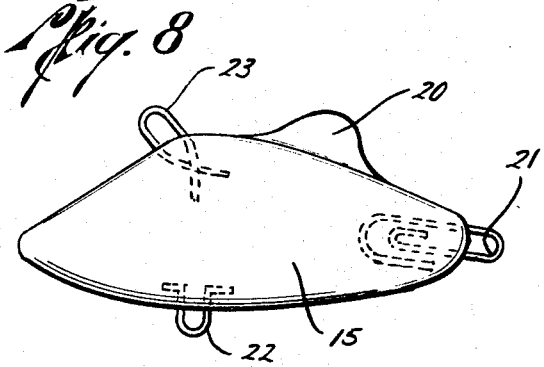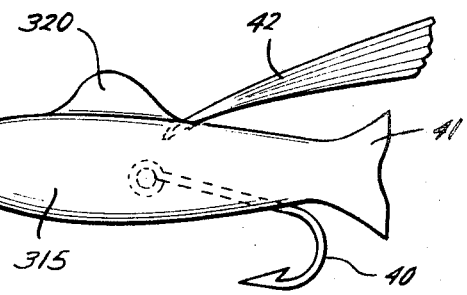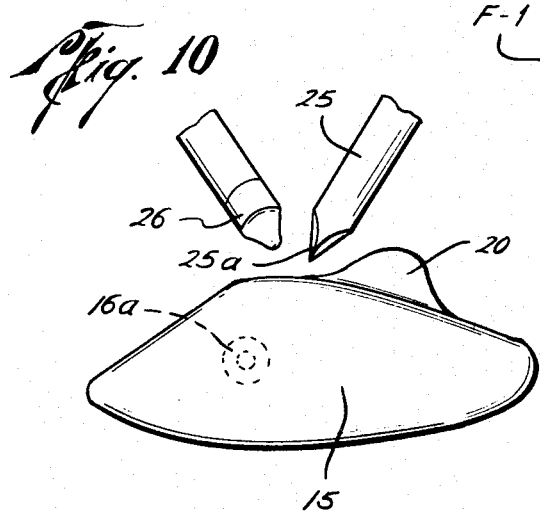

May 26, 1970     R. P. MONAGHAN ET AL     3,514,358
METHOD OF FORMING FISHING LURES AND THE LIKE
Filed June 3, 1968     5 Sheets-Sheet 3
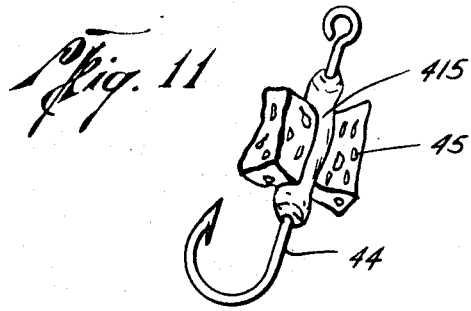
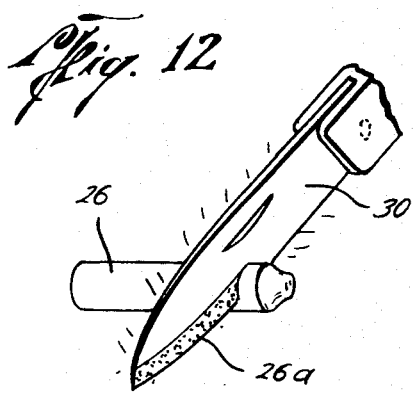
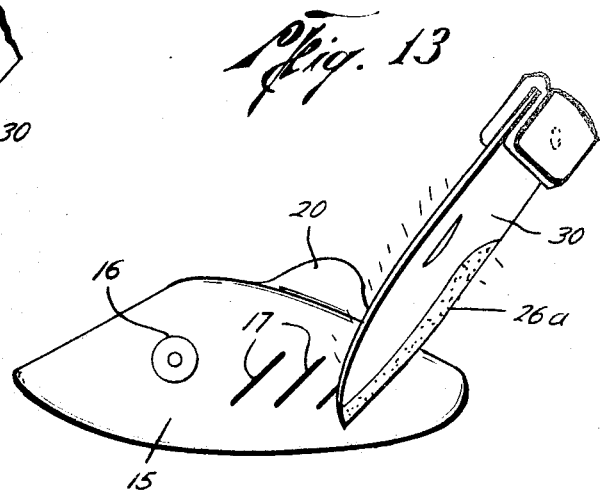
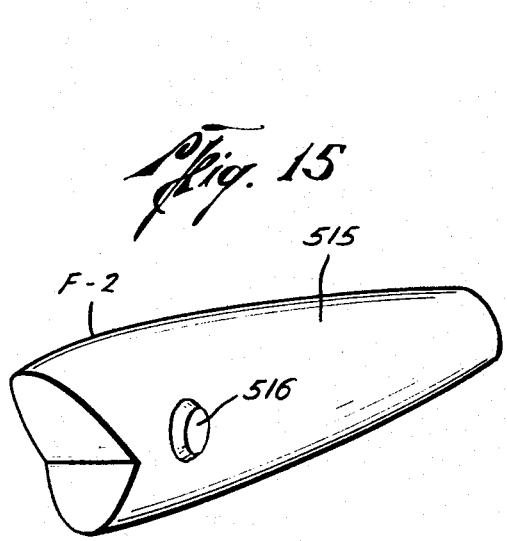
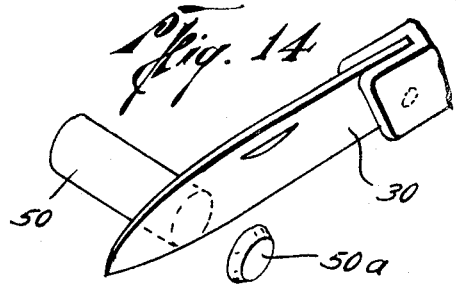
Richard P. Monaghan
Maurice P. Barton
INVENTORS
BY
Hayden Pravel Wilson & Matthews
ATTORNEYS

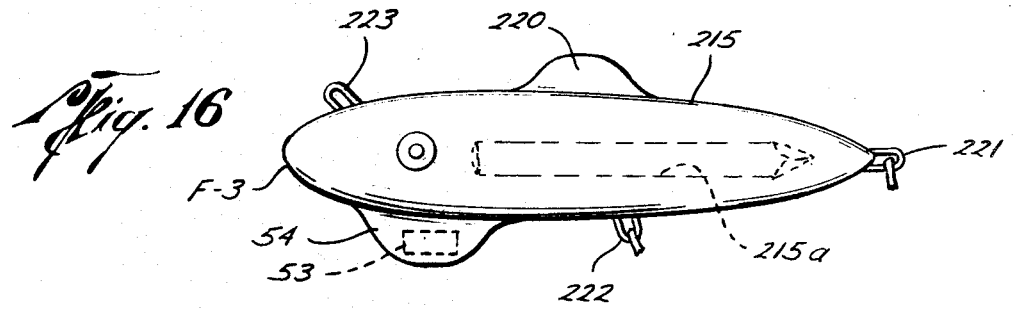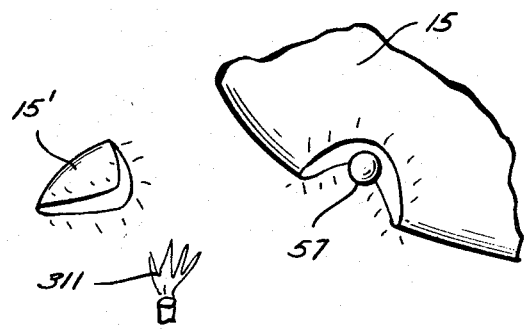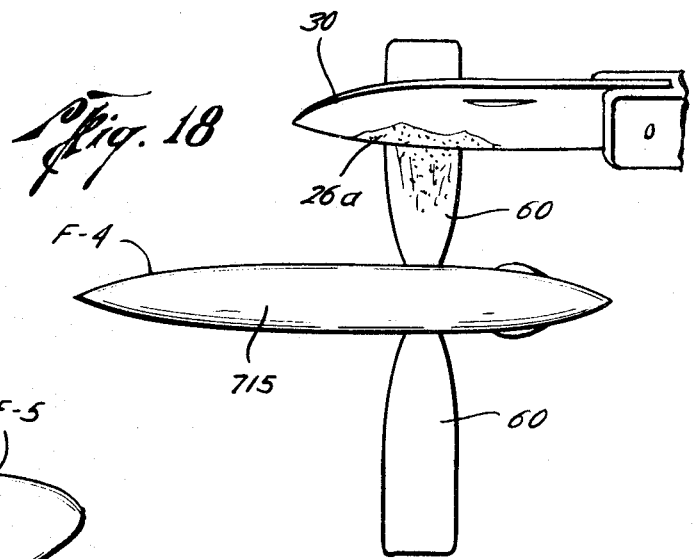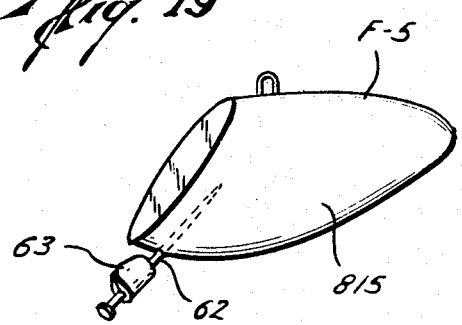

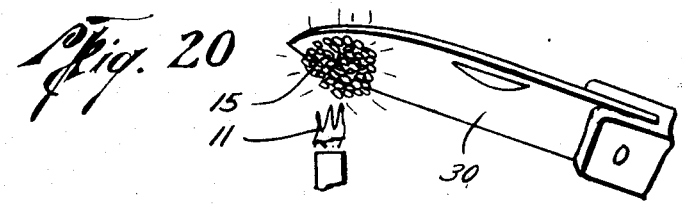
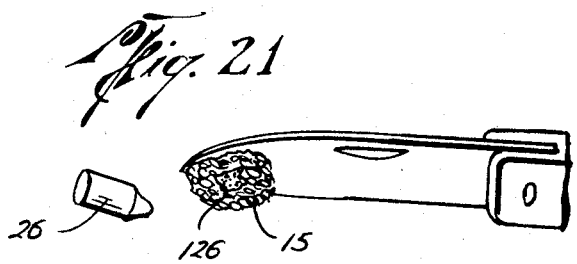
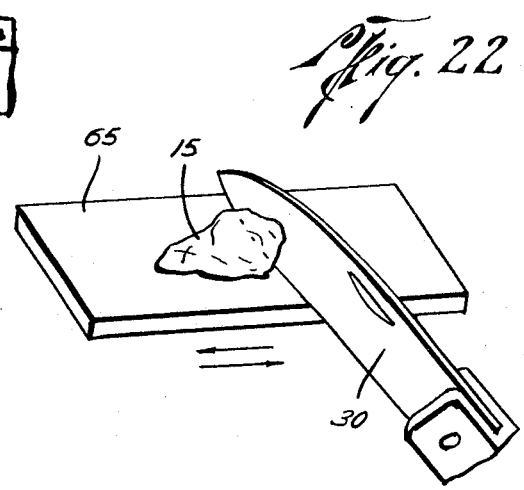
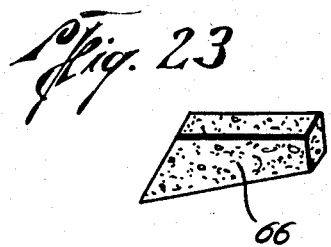
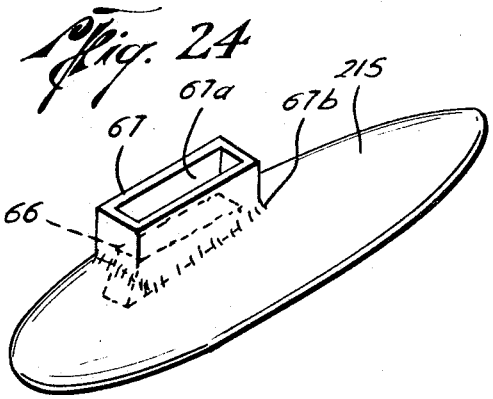
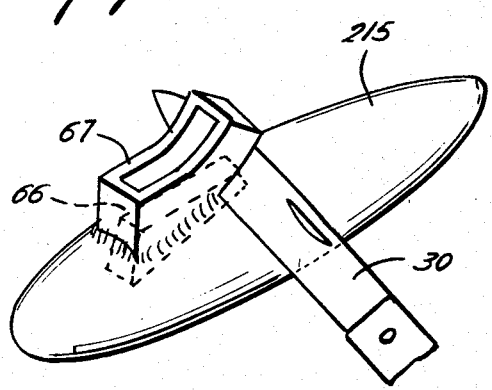
Richard P. Monaghan
Maurice P. Barton
INVENTORS
BY
Hayden Prevel Wilson & Matthews
ATTORNEYS United States Patent Office 3,514,358
Patented May 26, 1970

3,514,358
METHOD OF FORMING FISHING
LURES AND THE LIKE
Richard P. Monaghan and Maurice P. Barton, both of
P.O. Box 7, Overton, Tex. 75684
Filed June 3, 1968, Ser. No. 733,974
Int. Cl. B29c 15/00; A01k 85/00
U.S. Cl. 156—306
5 Claims

ABSTRACT OF THE DISCLOSURE

A method of forming fishing lures or the like wherein a plurality of thermoplastic beads or other quantity of thermoplastic material, preferably a vinyl-acetate copolymer, is softened and then unitized and shaped to a desired configuration for a fishing lure or the like, using the moistened hands of a person and thereafter the shaped material is reheated at localized areas to modify it by changing its shape or by adding fish hooks, feathers, bug eyes, fins, weights, flotation elements, or other items to provide a finished fishing lure or the like.

BACKGROUND OF THE INVENTION

The field of this invention is methods of forming fishing lures and the like.

Fishing lures or artificial bait for fishing have been made both commercially and at home by individual fisherman. Heretofore, such fishing bait or lures have been made in various ways, including the pouring of plastics into prefabricated molds or by otherwise manufacturing same with special molds, tools and equipment. Such prior procedures and materials used for fishing lures and bait have been relatively expensive and severely limited as to usefulness for home manufacture by fisherman or others, primarily because most fishermen want lures with individuality. Therefore, since molds reproduce the same configuration, the fisherman has to buy or make a new mold for each shape or design of fishing lure he desires, he cannot economically obtain such individuality.

SUMMARY OF THE INVENTION

With the method of the present invention, an individual can make his own fishing lure with any degree of individuality in design he desires, and while employing common tools and equipment which are readily available, such as a pocket knife, pliers and a nail. The lures or bait are formed from a thermoplastic material which softens when heated in boiling or hot water, or over an open flame, so that it may be unitized if formed as beads or pellets, and may be shaped using the moistened hands of a person. Such material must also be one that can be re-heated for subsequent modification as to shape or by addition thereto of fish hooks, feathers, bug eyes, fins, weights, flotation elements or other items. A satisfactory material is sold under the trademark "Elvax" and it is a copolymer of ethylene vinyl acetate. Such material may be used alone or with additives or modifiers. The material is cohesive so that by heating pieces or sections thereof, they can be joined together and remain bonded upon cooling to ambient temperature. Also, the material is adhesive when heated so that a hot steel or metal wire such as a hot fish hook may be inserted into the material and firmly bonded thereto when the wire and material cool to ambient temperature.

BRIEF DESCRIPTION OF THE DRAWING

FIG. 1 is an elevation of a typical fishing lure made by the method of this invention;

FIG. 2 is a vertical sectional view illustrating schematically the heating of a plurality of plastic beads or pellets in hot or boiling water as the first step in the method of this invention;

FIGS. 3, 4 and 5 are schematic views illustrating several types of unitizing and shaping phases which may be employed in carrying out the method of this invention;

FIGS. 6 and 7 are views illustrating a modification of the method of this invention wherein the body of the lure is formed with a hollow chamber to increase its floatability;

FIG. 8 is a view, in elevation, but illustrating in dotted lines, portions of metal hangers and eyelets suitable for attaching fish hooks and the like thereto, which have been embedded and bonded to the thermoplastic material forming the body of the lure;

FIG. 9 is an elevation of a modified form of the lure wherein a fish hook and feathers have been inserted and bonded to the body of the fishing lure after it has been shaped to a desired configuration;

FIG. 10 is a view, schematically illustrating the addition of coloring material to the body of the lure to represent an eye of a fish;

FIG. 11 is a perspective view illustrating a modified form of the invention wherein a sponge or similar material is bonded to a fish hook by a portion of thermoplastic material which has been elongated and shaped around the sponge and fish hook while in a softened condition;

FIGS. 12 and 13 are views which schematically illustrate the coloring of the lure with a knife and a crayon so as to embed and bond to the body of the lure the coloring material of the crayon;

FIGS. 14 and 15 are views which schematically illustrate the formation and the bonding of bug eyes to a fishing lure;

FIG. 16 is an elevation, illustrating a modified fishing lure wherein a piece of thermoplastic material has been bonded to the main body of the lure to incorporate therewith a weight or other items to change the movement characteristics of the lure when it is being pulled through the water with a fishing line;

FIG. 17 is a view, partially illustrating a lure and schematically showing the procedure for embedding and bonding the fishing weight into the configuration of the lure;

FIG. 18 is a view illustrating the coloring of the thermoplastic material by wiping a knife or similar device having melted crayon or similar material thereon across the thermoplastic material;

FIG. 19 is a view illustrating a modified fishing lure wherein a weight is secured to the lure externally thereof;

FIG. 20 is a view illustrating the heating and unitizing of a plurality of thermoplastic beads or pellets, using a flame rather than the heated water of FIG. 2;

FIG. 21 is a view illustrating the addition of coloring material of a crayon or the like to the softened thermoplastic material on a knife or other instrument;

FIG. 22 is a view illustrating the working or kneading of a thermoplastic material while in a softened condition to form a plastic material of desired color and consistency for subsequent shaping to a desired configuration; and FIGS. 23, 24 and 25 illustrate sequentially the addition of a flotation element such as a cork or Styrofoam block, followed by the subsequent reshaping of the lure with the flotation elements embedded therein.

DESCRIPTION OF THE PREFERRED EMBODIMENTS

In the drawings, the letter F designates generally one embodiment of a fishing lure, bait, or the like which is made by the method of this invention. The method of making the fishing lure F is illustrated essentially in FIGS. 2, 3, 5, 8, 10, 12 and 13. Thus, FIG. 2 illustrates schematically a pan having a handle 10a therewith which is adapted to be placed over a flame 11 from a typical gas stove or burner 12. The pan 10 is illustrated as resting upon a rack or support 12a disposed in any suitable manner in connection with the burner 12. The pan 10 has the water 14 therein which is adapted to be brought to a boil or heated sufficiently to render thermoplastic beads or pellets 15 cohesive and deformable. As previously explained, the thermoplastic beads or pellets are preferably made from a plastic such as a copolymer of ethylene vinyl-acetate, which is sold by one manufacturer under the trademark "Elvax." Such thermoplastic material becomes sufficiently cohesive and deformable above about 130° F. so that it may be handled by a person's moistened hands indicated at H (FIG. 3). The thermoplastic material 15 may be in the form of a unitary piece initially, but as explained above, it is preferably in the form of beads or pellets.

The softened thermoplastic material is removed from the pan 10 by spoon or other readily available utensil and then is transferred to the hand H of a person who is to shape and unitize the material 15. As illustrated in FIG. 3, the hands H, which have previously been dipped into cool water, are utilized for kneading the material 15 to unitize the various beads or pellets and to shape same to the approximate initial shape of the fishing lure, bait or other element. After such preliminary shaping, the material 15 may be returned to the hot water 14 for subsequent re-heating and for changing the shape thereof as desired so that the desired configuration of the fishing lure or the like is obtained.

In forming the fishing lure F of FIG. 1, the thermoplastic material 15 is initially shaped to form the body and then the upper portion is heated to form a fin 20 (FIG. 5) by using the thumb and one or two fingers to squeeze and pull the plastic material 15 and thereby shape same as indicated at 20 to simulate a fish fin. When the thermoplastic material 15 cools to ambient temperature or some temperature below about 130° F., the material 15 hardens sufficiently to retain its shape to which it has been formed when in the heated or softened condition. The material is somewhat resilient, but it will not change shape unless it is reheated so that it becomes softened again, either in whole or in part. Normally, softening is only at localized areas after the initial shaping and unitizing of the thermoplastic material 15 into the shape of the body of the fishing lure F.

Referring now to FIG. 8 of the drawing, therein can be seen a plurality of wire hangers or eyelets 21, 22 and 23, formed of steel or other metal, and each of which is inserted into the thermoplastic material 15 while heated so as to melt or soften the thermoplastic material 15 and permit the insertion thereof to the extent desired. Upon a cooling of the thermoplastic material and the wire forming each of the elements 21, 22 and 23, they become adhered or bonded together so that such hangers or eyelets 21, 22 and 23 cannot be readily pulled from the thermoplastic material 15. In fact, the elements 21, 22 and 23 are so firmly embedded and anchored within the plastic 15 that even a relatively heavy fish exerting a pulling force thereon cannot pull the elements 21, 22 or 23 from the main portion of the thermoplastic material 15. As illustrated in FIG. 8, the anchor 21 is formed with a conventional paper clip made of steel or other metal which has been heated over an open flame and then inserted.

Normally the paper clip 21 is held at its outer ends with a pliers (not shown) so that the clip 21 may be forced inwardly into the material 15, melting same or sufficiently softening same to permit the penetration and ultimately the bonding upon cooling of the clip 21 to the material 15. The eyelet 22 is inserted in the same manner as the clip 21, having previously been heated over an open flame or other source of heat and then handled with a pliers or other tool to insert same while heated to the extent indicated by the dotted line. Upon cooling, the portion indicated by the dotted lines of the eyelet 22 is bonded and securely adhered to the thermoplastic material 15. The eyelet 23 is similar to the eyelet 22, except that the inner ends are crossed and have a different configuration, which merely represents several different shapes for the hangers or eyelets 21, 22 and 23, the invention of which is not limited to any particular shape or configuration. As seen in FIG. 1, the eyelet 21 has a fish hook 25 secured thereto so that it may swivel in the usual manner relative to the main body of the fishing lure F. Also the eyelet 22 has a fishing hook 26 secured thereto so that it also may pivot relative to the thermoplastic material 15 of the lure F. The upper eyelet 23 is adapted to be engaged by a fishing line or leader in the conventional manner for the handling of the lure F in the water.

To form the eye 16 in the fishing lure F, a nail 25 (FIG. 10) is heated over an open flame or is otherwise heated and is brought into contact with a crayon 26 preferably the type sold under the trademark "Crayola" so as to transfer some of the crayon 26 to the heated nail 25 by melting the crayon 26. Thereafter, with a portion of the crayon 26 on the heated nail 25, the pointed end 25a of the nail 25 is pressed into the external surface of the body of the fishing lure F and penetrates the thermoplastic material 15 to thereby embed and transfer some of the coloring of the crayon 26 and to fuse same with the thermoplastic material 15 in the area designated by the dotted line 16a in FIG. 10. When the coloring material hardens and the thermoplastic material 15 hardens, the eye 16 of FIG. 1 has the desired form and is then a unitary part of the lure F.

FIGS. 12 and 13 illustrate the procedure for modifying the thermoplastic material 15 to provide embedded and bonded coloring material from crayon 26 (FIG. 12) to form a pattern such as indicated by the lines 17 (FIGS. 13 and 1). This is accomplished by heating a knife blade 30 over an open flame or other similar source of heat and then slicing into the crayon 26 so that a portion 26a of the crayon 26 is picked up for transfer to the cutting edge of the knife blade 30 (FIG. 12). Thereafter, the knife blade 30 is used to cut into the external surface of thermoplastic material 15 of the fishing lure S to soften or melt a localized portion of the thermoplastic material 15 at each line 17 and to thereby transfer to the sliced portion of the material 15 a part of the crayon 26a from the sharp edge of the knife blade 30. Since the crayon 26a is transferred into the open gash or slice 17 in the surface of the material 15 while they are both in a melted or heated condition, they bond together to form a unitary thermoplastic mass which has the appearance of a colored line 17 when the material 15 and the crayon 26a have cooled to ambient temperature. The number of such line 17 and the location thereof may be varied to suit the particular individuality and desires of the person making the lure F. Although the addition of the colored lines or stripes 17 to the thermoplastic material 15 are illustrated in the FIG. 13 as being made prior to the attachment of the eyelets or hangers 21, 22 and 23, it will be understood that either may be done ahead of the other to produce the final fishing lure F as shown in FIG. 1.

Various modifications in the configuration and arrangement of the fishing lure F may be made following modified procedures, some of which are illustrated in the other figures of the drawings. For example, in FIG. 4, the thermoplastic material is designated with the number 115 which illustrates an elongated body of the thermoplastic material which has been heated, either throughout its entire portion or at the end thereof so that the fingers H' may be used after being moistened with cool water, to form a reduced thickness portion 115a or other modified shape in the lure.

A further modification is illustrated in FIG. 6 wherein the thermoplastic material is initially formed into a body 215 (FIG. 6) into which is inserted a cold nail 225 or similar tool at ambient temperature or below to provide a pocket or bore 215a. A closure piece 215b, also formed of the same thermoplastic material in the preferred form of the invention, is shaped so that it conforms to the shape of the body portion 215. The inner ends 215c and 215d are softened or heated using an open flame 211 from a heating element 212 or any other suitable source of heat so that such surfaces 215c and 215d may be bonded together by cohesion and will remain firmly bonded after the surfaces 215c and 215d have cooled to ambient temperature. When such cooling takes place, the closure piece 215b seals the bore 215a to thus provide a chamber of air within the body 215 to thereby increase its floatability, which is desirable in connection with certain types of lures, as will be well understood. The body 215, with the closure 215b secured thereto may thereafter be modified in any manner such as described heretofore in the methods of making the lure F of FIG. 1.

In some instances, instead of having the hooks secured to eyelets such as 21 and 22 (FIG. 1), it is desirable to insert a fixed hook 40 into the lure, one of which is designated F-1 in FIG. 9. The hook 40 formed of steel or other metal is inserted by heating same over an open flame or other similar source of heat and then forcing the heated hook into the thermoplastic material 315 which corresponds with the thermoplastic material 15. The hook 40 melts the material 315 in the same manner as explained heretofore in connection with the eyelet or hangers 21, 22 and 23 so that the hook 40 actually bonds to the material 315 when the material 315 and hook 40 have cooled. It is to be noted that the lure F-1 not only has a fin 320 formed thereon, but it also has a tail 41 resembling the tail of fish or minnow. Feathers 42 may be secured to the body formed by the thermoplastic material 315 by inserting a hot nail or other instrument into the thermoplastic material 315 to form an opening and to provide a softened portion of the material 315 into which the ends of the feathers 42 are positioned so that upon cooling of the heated material 315, the feathers 42 are securely bonded thereto and remain therewith during fishing and casting.

In FIG. 11 a fish hook 44 of conventional shape and construction is illustrated as having a piece of sponge 45 secured thereto by an elongated piece of the thermoplastic material 415 which is preferably of the same type of thermoplastic material as described as material 15 in connection with FIG. 1. Such material 15 is softened or heated so that it is capable of bonding to the sponge 45 and to the fish hook 44 and remains securely bonded after it has cooled to ambient temperature. The fish hook 40 with the sponge 45 secured thereto may be inserted into a body 315 or the like as heretofore described in connection with the hook 40 of FIG. 9, or it may be used by itself as shown in FIG. 11. The sponge 45 may be used for receiving a scent which attracts fish, a common type of scent being cod liver oil.

Instead of forming the eye 16 of the lure F as described heretofore in connection with FIG. 10, a bug eye or eyes may be formed on a fishing lure such as the one illustrated as F-2 in FIG. 15. The lure F-2 is formed of thermoplastic material 515 which preferably corresponds with the material 15 of FIGS. 1-3 as previously explained, but it will be noted that the shape or configuration of the lure F-2 has been modified as compared to the lure F of FIG. 1. The bug eyes 516 are formed from a separate quantity of thermoplastic material preferably shaped initially as a rope or elongate portion 50, and which preferably is also of the same thermoplastic material as the material 15 heretofore described. The material 50 may previously be colored by having crayon dropped thereon in melted droplets and thoroughly mixed therewith while in the softened condition. In such event, each slice 50a from the rope-like portion 50 is a uniformly or substantially uniformly colored thermoplastic material which is capable of bonding to the thermoplastic material 515 of the lure F-2, or any of the other thermoplastic materials heretofore described or hereinafter described herein. The slices 50a are cut with a knife 30 or any other suitable sharp instrument so that each slice 50a may be bonded to form each eye 516 (FIG. 15). Localized heating may be obtained with respect to the material 515 by the use of an open flame or other heating medium prior to bonding the slice 50a thereon to form each eye 516. Since each eye 516 projects outwardly from the surface of the body formed by the material 515, it has the appearance of being a bug eye which some fish have and thereby provides a different appearance for the fishing lure F-2 as compared to the lure F of FIG. 1.

In FIG. 16, the body or thermoplastic material 215 of FIG. 7 is shown after it has been fully formed and subsequently modified to form another style of fishing lure F-3. A hollow chamber 215a provided by the use of the nail 225 constitutes an air chamber so that the fishing lure F-3 will float at or near the surface of the water during fishing. To distribute the weight of the lure F-3 in a way to change its flotation characteristics and its movements while being pulled toward the fisherman with a line, a weight 53 or other object which is heavier in density than the thermoplastic material and which has previously been embedded in a small piece of thermoplastic material 54 is bonded to the external surface of the thermoplastic body 215 as illustrated in FIG. 16. Also, eyelets 221, 222 and 223 are illustrated as being secured to the lure F-3, using the method heretofore described in connection with FIG. 8. A fin 220 is also illustrated on the lure F-3 and it is formed using the method described heretofore in connection with FIG. 5. It will be appreciated that various other modifications of the lure F-3 may be made, using any of the other techniques described heretofore or hereafter. To embed a weight such as the weight 57 shown in FIG. 17 within the configuration initially formed for the body 15, the procedure illustrated in FIG. 17 may be utilized. Thus, a section 15' is cut from the body 15 to leave a recess into which the weight or other heavy density object 57 may be disposed. The surfaces which contact each other on the piece 15' and the rest of the body are then heated by a flame 311 from a gas burner or any other suitable heating means so that such surfaces become softened for bonding to each other and to the weight 57 when they are pressed together. The final external shaping of the piece 15' with the rest of the thermoplastic material 15 forming the body of the lure F may then be accomplished so that it will be substantially impossible to observe that the weight 57 has been added internally of the thermoplastic material 15. This is particularly true if the material 15 and the piece 15' have been colored with coloring material such a crayon during the kneading and unitizing step of FIG. 3 so as to render them opaque.

Coloring material may be applied to the external surface of any portion of the lures heretofore described by depositing a quantity such as indicated at 26a on a knife blade 30 while the blade 30 and the crayon 26a are both heated and then the heated blade with a quantity of the crayon 26a may be wiped in strokes across the surface of the plastic material to soften same and transfer a portion of the crayon 26a to the plastic material. Thereafter, when the plastic and the crayon harden, they are unitized and leave a permanently colored surface on the thermoplastic material.

In FIG. 18, the lure F-4 illustrates a further modification of a fishing lure which may be made using the methods of this invention and it illustrates additional wings 60, each of which may be made of the thermoplastic material which has been shaped to such configuration as illustrated in FIG. 18, or which may be made of feathers or other suitable materials. As illustrated in FIG. 18, the material forming the wings 60 is the same thermoplastic material as indicated by the numeral 15 in the FIGS. 1–3 and it has inner ends bonded to the main body of 715 of the lure F–4 by bonding and cohesion therebetween. The wings 60 are illustrated as being externally colored by wiping melted crayon from a knife blade thereon, as previously explained. Although the coloring of the external wings 60 only is illustrated in FIG. 18, it will be understood that such procedure for coloring the thermoplastic material may be utilized for any of the other fishing lures or parts thereof.

FIG. 19 indicates a modification of this invention in which a portion of a lure F–5 has an external weight having a density heavier than the thermoplastic material and secured thereto by means of a straight pin 62 which has been inserted and bonded to the thermoplastic material 815 of the lure F–5. A lead weight 63 or other suitable weight may be positioned at various points on the pin 62 and in the material 815 for obtaining the desired type of movement of the lure F–5 as it is pulled through the water back to the fisherman. Several of such weights 63 may be employed in different locations and such weights may be changed to different positions as desired by softening the material 815 and moving the pins 62 to a different position.

In FIGS. 20, 21 and 22, another procedure for initially heating the thermoplastic material 15 is illustrated. As shown in FIG. 20, a knife blade 30 which is heated over an open flame 11 or any other suitable source of heat, may be used to pick up a plurality of heated thermoplastic beads or pellets because they will adhere and stick to each other and also temporarily stick to the blade 30 to form a unitary mass. While the material 15 is softened by the heated knife, open flame 11, or the hot or boiling water 14, a small amount of crayon 26 may be heated and while in a melted condition dropped into the material 15 (FIG. 21), a drop of which is indicated at 126. The coloring from the crayon 26 may then be thoroughly distributed as the material 15 is kneaded or worked back and forth with the hands or the knife blade 30 on a board, pallet, or stone 65 (FIG. 22). Such working of the material 15 must be accomplished while it is in a softened state and therefore if the material becomes too stiff to work or mix with the drops from the crayon 26, it is reheated by reheating the knife blade 30 or otherwise applying heat thereto. Such quantity of thermoplastic material 15 produced by such procedure illustrated in FIGS. 20, 21 and 22 may be the basis for forming the initial body for the lure and may be worked with the hands thereafter, providing the hands are moistened and are sufficiently cool so that they do not stick or become burned during the handling of this material 15. Also, small quantities of the thermoplastic material 15 may be shaped and added to a fishing lure body which has previously been formed, regardless of the method of heating the material 15, whether by using a knife and an open flame 11 as illustrated in FIG. 20 or by using the hot or boiling water 14 as illustrated in FIG. 2.

In some instances, it is desirable to insert a foreign object having a density lighter than the thermoplastic material such as a piece of cork or Styrofoam 66 (FIG. 23) into the lure and for this purpose, the thermoplastic material such as material 215 of FIGS. 6 and 7 is modified as illustrated in FIG. 24 to provide a cut-out portion for receiving the Styrofoam or cork 66. Any floatable material having a density lighter than the thermoplastic material 15 may be utilized so long as it will bond to the material 215 and is capable of being inserted in a recess as illustrated in FIG. 24. After the recess is formed and the lighter density floatable material 66 is positioned as illustrated in FIG. 24, an additional piece of thermoplastic material 67 is preferably bonded to the material 215 so as to form a tight cover or skin of thermoplastic material 67 around the upper portion of the flotation material or element 66. Normally, the section 67 is provided with an opening 67a which is left open while the lower portion 67b is securely bonded and blended into the external surface of the material 215. Such bonding is effected by the heating of adjacent surfaces of the piece 67 and the material 215 to form the softened bond at 67b. Thereafter, the excess portion of the piece 67 may be cut therefrom using the knife blade 30. An additional quantity of thermoplastic material may then be shaped and bonded to the upper surface of the material 215 as desired to provide any configuration for a fishing lure, with the Styrofoam or other floatable material 66 securely bonded and embedded within the material 215.

Other variations and changes in the methods of manufacture of a fishing lure and the like may be employed within the scope of this invention, and the drawings and above description are merely illustrative of the many variables of the present invention.

We claim:

1. A method of hand forming a desired object comprising the steps of:
   (a) heating a quantity of a copolymer of ethylene vinyl acetate thermoplastic material to soften same to render it deformable to a different shape;
   (b) moistening the hands of a person at approximately the time the material has become sufficiently softened for shaping same;
   (c) manually shaping the material to a desired configuration for a desired object while in the softened state using the moistened hands of the person;
   (d) allowing the shaped material to cool sufficiently to set to the shape to which the material was formed while in the softened state;
   (e) thereafter reheating the shaped material; and
   (f) modifying said material at localized areas thereof.

2. The method set forth in claim 1, including:
   (a) melting a portion of a crayon;
   (b) depositing drops of the melted crayon at various parts of the thermoplastic material while it is in the softened state;
   (c) kneading said thermoplastic material while maintaining same soft and adhesive to distribute and bond the crayon in said thermoplastic material to color same; and
   (d) thereafter effecting said shaping of said thermoplastic material to the desired configuration.

3. The method set forth in claim 1, including:
   (a) inserting a cold wire at ambient temperature or below into said thermoplastic material after it is at least partially shaped and then withdrawing said wire from the material to form a hollow bore in said material;
   (b) softening and shaping a second piece of thermoplastic material to form a closure for said hollow bore; and
   (c) thereafter bonding the adjacent ends of said thermoplastic material to each other while in a softened state to thereby form a closed air chamber in the bonded thermoplastic material to facilitate flotation thereof in water.

4. The method set forth in claim 1, wherein:
   (a) said quantity of thermoplastic material is a plurality of thermoplastic pellets each of which is rendered cohesive with adjacent thermoplastic pellets to form a unitary mass when sufficiently heated; and
   (b) said pellets being unitized and bonded together to form a unitary mass for said shaping thereof to a desired configuration.

5. The method set forth in claim 1, wherein said modifying of said material includes:
   (a) heating a knife;

(b) contacting a crayon with said knife while said knife is heated to pick up a portion of said crayon on said knife; and (c) thereafter contacting said thermoplastic material with said crayon on said knife to soften the thermoplastic material and transfer the crayon from said knife to said material to form a bond between said crayon thus applied and said thermoplastic material without bonding the knife to said thermoplastic material.

References Cited

UNITED STATES PATENTS

| | | | |
|---|---|---|---|
| 2,194,579 | 3/1940 | Wedger | 264—331 XR |
| 2,332,447 | 9/1943 | Higgins | 264—294 XR |
| 2,420,614 | 5/1947 | Norman | 264—331 XR |
| 2,740,226 | 4/1956 | Arff | 264—274 XR |
| 2,741,058 | 4/1956 | Allmon | 43—43.24 |
| 3,171,823 | 3/1965 | Murphy | 264—294 XR |
| 3,290,166 | 12/1966 | Sharp | 264—132 XR |
| 3,349,513 | 10/1967 | Jeff | 43—42.53 |
| 3,446,900 | 5/1969 | Kamen | 264—132 XR |

ROBERT F. WHITE, Primary Examiner

R. R. KUCIA, Assistant Examiner

U.S. Cl. X.R.

35—26; 43—42.53; 264—132, 245, 274, 296